March 26, 1963 C. D. DOSKER 3,082,726
INSULATED FLOOR CONSTRUCTION AND ELEMENTS
Filed July 9, 1958
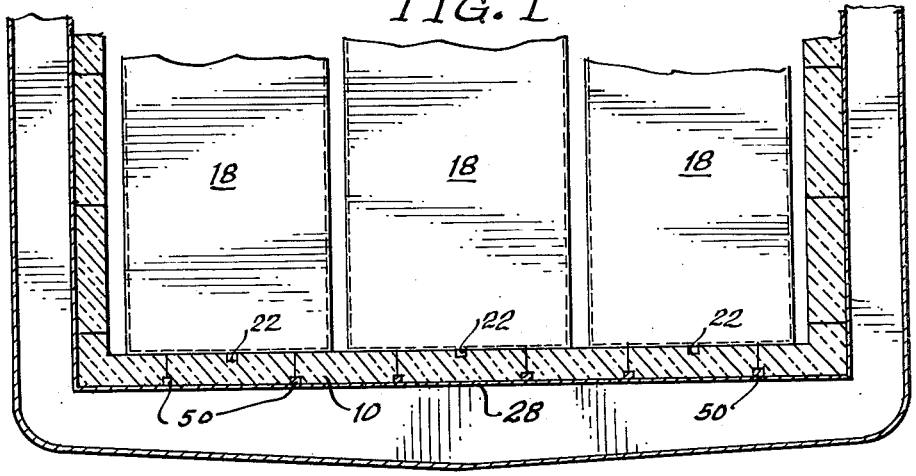
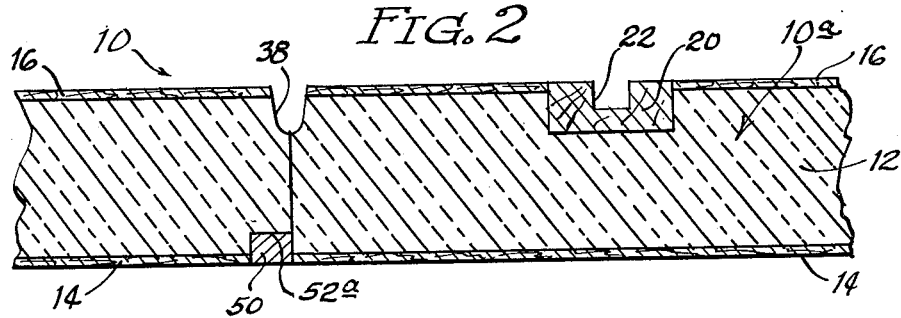
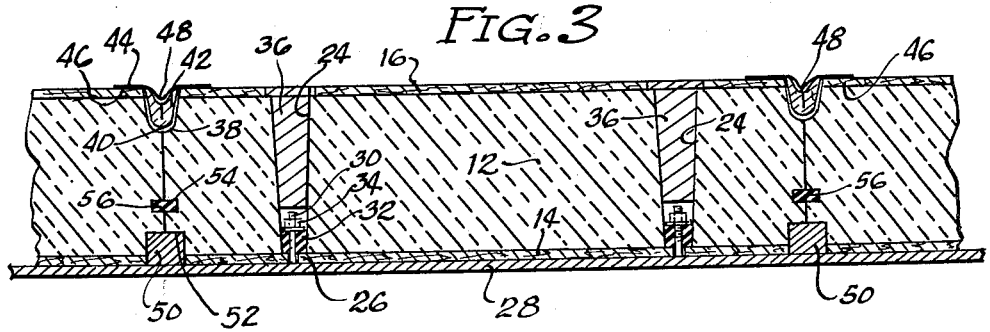
INVENTOR.
Cornelius D. Dosker
BY
Ooms, McDougall, Williams & Hersh
Attorneys 3,082,726
INSULATED FLOOR CONSTRUCTION AND ELEMENTS
Cornelius D. Dosker, Louisville, Ky., assignor, by mesne assignments, to Conch International Methane Limited, Nassau, Bahamas, a corporation of the Bahamas
Filed July 9, 1958, Ser. No. 747,389
3 Claims. (Cl. 114—74)

This invention relates to the construction of an insulated space and it relates more particularly to the floor construction of an insulated space wherein use is made of modular panels of large dimension for aligning the walls and the floor of the hold space of a ship to insulate the space for storage and transportation of a material which needs to be maintained at a temperature differing widely from ambient temperature.

The invention will be described with reference to the transportation by ship of a liquefied gas from a source of plentiful supply to an area where a deficiency exists. It will be understood that the concepts described will have application to the shipment of other liquefied gases or other materials which need to be maintained at equivalent cold temperature.

In my copending application Ser. No. 646,001, filed March 14, 1957, description is made of the means for insulating the hold space of a ship for mounting large metal tanks therein which are adapted to house the liquefied natural gas. Insulation of the hold space is effected by the use of large modular panels of insulation formed of a relatively thick central section having a highly porous, structurally strong and dimensionally stable insulation material faced on its inner and outer surfaces with plywood panels having high structural strength.

The panels are mounted in end-to-end and in side-by-side relation on the supporting side walls substantially completely to cover the walls. Attachment is effected by means of Nelson studs which are inserted from the inside through spaced openings extending through the panels and brought into engagement with aligned portions of the wall for welding thereto. Portions of the studs extend inwardly through the openings for engagement with a locknut with a resilient washer between each locknut and the outer plywood panel to press against the panel with a force sufficient to hold the panels on the wall when the locknut is tightened down. The openings are later filled or plugged and the panels mounted on the walls are interconnected one with the others adjacent thereto with a blocking spline and with a sealing expansion strip to effect sealing engagement between the panels in a manner to enable relative movement between adjacent panels in response to the expansions and contractions taking place due to temperature change but without breaking the seal.

The floor panels are of similar construction but they will be subject to greater forces in response to the rolling movements of the ship. In the main, these forces will be crosswise forces which will tend to disturb the positions of the panels and it is with the intent of obviating this possibility to which this invention is addressed.

Thus it is an object of this invention to provide floor panels of insulation material and a means for holding the panels onto the floor in a manner to prevent relative or inadvertent movements.

These and other objects and advantages of this invention will hereinafter appear and for purposes of illustration, but not of limitation, an embodiment of the invention is shown in the accompanying drawing in which—

FIGURE 1 is a schematic elevational view partially in section of a portion of the ship's hold embodying the features of this invention;

FIGURE 2 is a sectional elevational view of a portion of the insulation panels mounted as a flooring on the bottom of the hold, and FIGURE 3 is a sectional elevational view similar to that of FIGURE 2 showing the arrangement of parts in assembly but of a different portion of the floor construction.

In accordance with the practice of this invention, use is made of large, prefabricated panels 10 of thermal insulation embodying a relatively thick central section 12 or core of a structurally strong, dimensionally stable, thermal insulating material faced on its bottom side with a sheet 14 of plywood, preferably formed of hardwood plies, and faced on its top side with a similar sheet 16 of plywood. The facing sheets 14 and 16 are adhesively bonded to the insulation core 12 to form a modular panel. The panels are preferably formed to a rectangular shape with a lengthwise and crosswise dimension that may range from 4 to 16 feet and with a thickness of about 6 to 24 inches.

The core 12 may be formed of a highly porous, low density wood, such as balsa wood or quippo, or it may be formed of a honeycomb constructed of resinous treated paper, corrugated veneers or the like.

The panels, such as illustrated by the panel 10$^a$, adapted to be aligned with the centers of the tanks 18 lengthwise of the ship are formed with a relatively heavy insert 20 of hard wood in its upper portion in which a lengthwise aligned spaced-apart groove 22 is formed for use as a keyway in which the key extending downwardly from the bottom wall of the tank is received for positioning the tank in the insulated space.

For attachment in the manner previously described for the wall panels, the floor panels 10 may be provided with a plurality of spaced-apart openings 24 extending downwardly therethrough with the openings 26 through the bottom plywood panel being of smaller dimension than the remainder. This enables the panels to be anchored to the metal floor plate 28 by the use of Nelson studs 30 welded to the floor plate in alignment with each of the openings. The panels 10 are positioned so that a stud 30 projects partially through each of the openings 24. A resilient washer 32 is positioned about a portion of the stud extending into an opening and a locknut 34 is threaded onto the stud and turned down to bring the resilient washer into pressing engagement with the plywood panel 14 with a force sufficient to hold the panel onto the floor. The remainder of the openings 24 may be filled with a plug 36 of an insulating material.

As in the wall panels, the linear edges between adjacent panels are formed with recesses or grooves 38 to provide a contiguous opening 40 therebetween in which a wooden spline 42 is inserted having a kerf running lengthwise through the central portion thereof to enhance flexibility. The side walls of the spline are adhesively secured to the adjacent wall portions of the panels to effect a joinder between the panels and the spline and prevent the formation of an opening between the panels.

The adjacent panels are joined one to the other in sealing relation by means of expansion strips 44 in the form of a metal member or a glass fiber reinforced polyester plastic dimensioned to have a width to overlap the adjacent edge portions of adjacent panels for adhesive attachment thereto in sealing relation, as at 46. The linear expansion strips are formed with a bulbous portion 48 extending lengthwise through the central portion thereof and the spline 42 is recessed to enable the bulbous portion to be received therein in unbonded relation. Thus the expansion strip is capable of increase or decrease in crosswise dimension responsive to relative movement between adjacent panels by reason of the natural expansions and contractions which take place due to temperature change.

To the present, the panels and their assembly more or less correspond to the construction and assembly of the wall panels, set forth in the aforementioned copending application. The concepts of this invention are addressed to a new and novel construction wherein the panels are held onto the floor in a manner to prevent relative shifting movement responsive to the rolling or tossing movements of the ship.

It has been found that the tossing movements of the ship do not tend to effect lengthwise displacement of the panels such that the described means for attachment is sufficient to hold the panels in the desired assembled relation. The roll of the ship is such as to introduce a considerable amount of force operating in the crosswise direction which tends to disturb the position of the panels and to effect relative shifting movement in the crosswise direction. This is undesirable, especially in the light of the fact that the floor panels are employed as stabilizing elements to position the tanks within the insulated ship's hold.

To obviate inadvertent displacement of the floor panels, the floor plates 28 are constructed with strips 50 of metal, wood, plastics or other relatively rigid material of rectangular or other polygonal or curvilinear shape fixed to extend lengthwise of the ship in laterally spaced-apart relation. The spacing between the strips 50 or rails is adapted to correspond to the width of the floor panels 10 and to be in position to correspond with the linear lateral edges thereof when in position of use. The panels 10 are each formed with recesses 52 in the lateral edges and along the bottom side thereof dimensioned to have a height corresponding to the height of the rail 50 and a width corresponding to about one-half the width of the rail. In installation, the panels can be laid down onto the floor plates in end-to-end and in side-by-side relation with the strip or rail 50 fitting into the recessed portion 52. Each rail or strip will be received in the recess formed between the adjacent linear edges of adjacent panels to engage the panels on each side. Thus the base of each of the panels is blocked at opposite edges by the lengthwise extending rails or strips to prevent crosswise displacement of the panels.

In assembly, the panels 10ª having the keyed inserts 20 are positioned on the floor in lengthwise alignment with the centers of the tank to be received in the insulated space to hold the tanks in the centered relation. As shown in FIGURE 2 of the drawing, the latter panels may be aligned between the spaced rails embracing the lateral edges of the panels. Under such circumstances, the adjacent edges of the adjacent panels would be provided with grooves 52ª dimensioned to receive the entire rail therein.

With the described rail or strip assembly, it may be unnecessary to make use of the specific attachment means previously described since the weight of the tanks and the weight of the panels would be sufficient to hold the panels down onto the floor while the lengthwise rails operate to hold the panels against relative movements. Thus a paneled floor of insulation can easily and efficiently be installed to provide an insulated space.

As in previous constructions, the floor panels may be formed with grooves 54 extending continuously about the perimetric walls for registration with corresponding grooves of adjacent panels to provide a crosswise extending opening therebetween adapted to receive a continuous strip 56 of resilient material to block any space formed between the panels and to prevent flow of convection currents.

It will be apparent from the foregoing that I have provided a means for insulating a large space in which material is to be stored at a temperature differing widely from the ambient temperature and that I have also provided elements which may be prefabricated for quick and easy installation onto the walls and floor of the storage space in a manner to retain the panels in their assembled relationship.

It will be understood that the rails and the corresponding recesses in the panels may be provided to extend lengthwise through an intermediate portion of the panels for stabilizing the panels against movement in the crosswise directions but it is preferred to make use of an arrangement wherein the rails coincide with the linear edges between adjacent panels for stabilization.

It will be understood that changes may be made in the construction, arrangement and operation without departing from the spirit of the invention, especially as defined in the following claims.

I claim:

1. In a ship for the transportation of a material which needs to be maintained at a temperature differing widely from the ambient temperature in individual cargo tanks located within the hold space of the ship, said ship having a large hold space defined by side walls and a bottom wall forming a part of the ship's structure, means for insulating the hold space comprising a plurality of separate preformed insulation panels of predetermined lengthwise and crosswise dimension laid in end-to-end and in side-by-side relation on the bottom wall of the ship's hold and on which the tanks rest, rails extending lengthwise of the ship and fixed to the upper surface of the bottom wall of the hold space in laterally spaced apart relation corresponding to the crosswise dimension of the insulation panels and dimensioned to have a height corresponding to a fraction of the thickness of the panels, said panels having recesses extending lengthwise in the bottom walls thereof dimensioned to receive the rails in closely fitting relationship therein to prevent sidewise displacement of the panels relative to the ship, and other means separate and apart from the rails for holding down each of the panels onto the floor.

2. In a ship for the transportation of a material which needs to be maintained at extremely low temperature in cargo tanks located within the hold space of the ship, said ship having a large hold space defined by side walls and a bottom wall forming a part of the ship's structure, means for insulating the hold space comprising a plurality of insulation panels of predetermined lengthwise and crosswise dimension laid in end-to-end and in side-by-side relation on the bottom wall of the hold space and on which the tanks rest, rails extending lengthwise of the ship and fixed to the upper surface of the bottom wall of the hold space in laterally spaced apart relation corresponding to the crosswise dimension of the panels and in endwise alignment with the meeting lateral edges thereof and in which the rails are dimensioned to have a height less than the thickness of the panels, said panels having recesses extending lengthwise through the bottom along the lateral edges dimensioned to correspond to the height of the rails and to about one-half of their width whereby the adjacent panels arranged in side-by-side relationship form a contiguous opening therebetween dimensioned to receive the rails in substantially closely fitting relation, and other means separate and apart from the rails for holding down each of the panels onto the floor.

3. A ship as claimed in claim 1 in which the panels lengthwise aligned with the centers of tanks adapted to be supported thereon include an insert of hardwood in their upper surface and a lengthwise aligned groove in the insert for use as a guideway.

References Cited in the file of this patent

UNITED STATES PATENTS

| | | |
|---|---|---|
| 2,362,252 | Ellinwood | Nov. 7, 1944 |
| 2,705,414 | Rose | Apr. 5, 1955 |
| 2,738,749 | Macy et al. | Mar. 20, 1956 |
| 2,896,416 | Henry | July 28, 1959 |
| 2,905,352 | Henry | Sept. 22, 1959 |
| 2,911,125 | Dosker | Nov. 3, 1959 |
| 2,954,003 | Farrell et al. | Sept. 27, 1960 |

FOREIGN PATENTS

| | | |
|---|---|---|
| 667,215 | Great Britain | Feb. 27, 1952 |